J. S. WILSON AND W. E. DALBY.
GUN SIGHT.
APPLICATION FILED AUG. 7, 1917.
1,303,440.
Patented May 13, 1919.
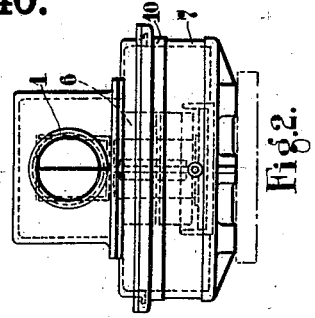
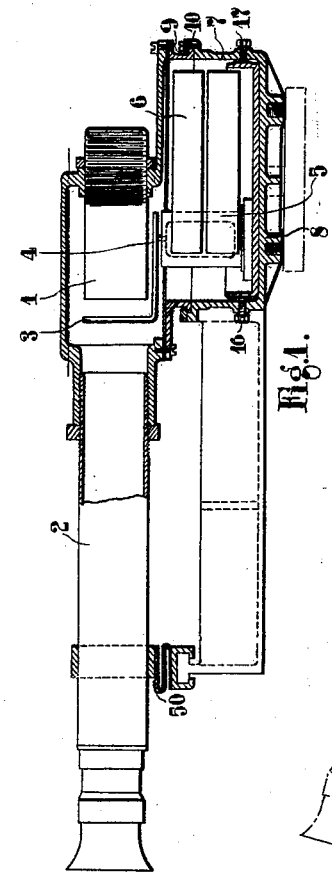
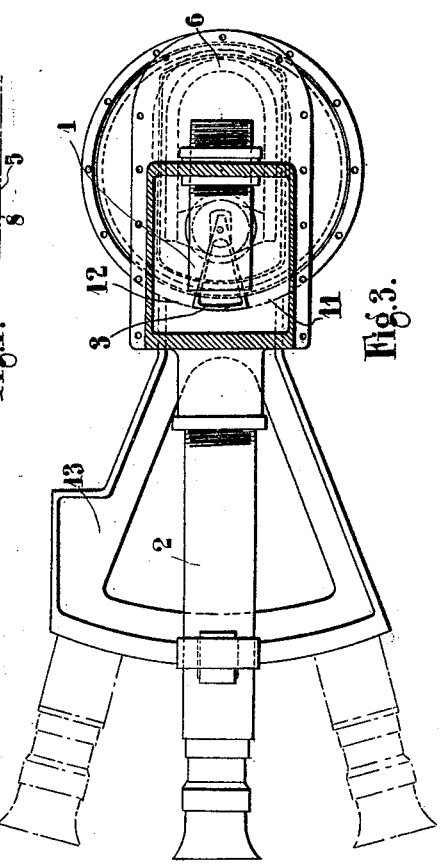

UNITED STATES PATENT OFFICE.

JOHN SIGISMUND WILSON AND WILLIAM ERNEST DALBY, OF LONDON, ENGLAND, ASSIGNORS OF ONE-THIRD TO SIR W. G. ARMSTRONG-WHITWORTH AND COMPANY LIMITED, OF NEWCASTLE-UPON-TYNE, ENGLAND.

GUN-SIGHT.

1,303,440.   Specification of Letters Patent.   Patented May 13, 1919.

Application filed August 7, 1917.   Serial No. 184,982.

*To all whom it may concern:*

Be it known that we, JOHN SIGISMUND WILSON, a subject of the King of Great Britain and Ireland, and residing at 29 Denbigh street, London, S. W., England, and WILLIAM ERNEST DALBY, a subject of the King of Great Britain and Ireland, and residing at the city and Guilds (Engineering) College, Exhibition Road, London, S. W., England, have invented certain new and useful Improvements in Gun-Sights, of which the following is a specification.

The present invention relates to apparatus for sighting guns on targets, and is especially applicable to sighting on targets in cases in which there is relative movement between the gun and the target.

The invention consists in sighting apparatus for guns comprising sighting devices, one of which is situated at the optical center of the object glass of a telescope, while the other is in the form of a moving wire or the like placed so that it is in focus when viewed through the eyepiece and is controlled by an electric current from a distance.

The invention further consists in sighting apparatus for guns comprising sighting devices, one of which is at the optical center of the object glass of a telescope, while the other is in the form of a moving wire or the like situated in the focal plane of the principal focus of the object glass and is controlled by an electric current from a distance.

The invention further consists in the improved sighting apparatus for guns hereinafter described.

Referring to the accompanying drawings:

Figure 1 is a sectional elevation of the sighting telescope of a gun constructed according to the invention;

Fig. 2 is an end elevation of the same, while

Fig. 3 is a plan of the sighting telescope with part of the cover removed.

In carrying the invention into effect according to the example illustrated, the foresight of the gun is the optical center of the combination of lenses carried in the tube 1 forming the object glass of the telescope 2. The back sight is the wire 3 carried on the pointer 4, which is suitably formed for the purpose on the galvanometer having a movable armature 5, and magnet 6. The pointer with the galvanometer is thus adapted to act as the back sight of the gun. The galvanometer is carried in an iron box 7 which is fixed to the gun cradle or gun carriage by bolts inserted at 8, 8. The dotted line indicates a support rigidly connected with the gun cradle or carriage. A cover 9 is jointed with the box 7 by the ring joints 10, so that it can move relatively to the box 7 through any desired angle about the axis passing through the optical center of the object glass combination 11.

In the arrangement illustrated, the wire 3 is situated in the focal plane at the principal focus of the object glass combination contained in the tube 1.

The telescope formed by the object glass element 1 and the eyepiece element 2 is secured to the cover 9, and the elements of the telescope are secured to the cover 9 so that the object glass combination 1 can be adjusted to bring its optical center accurately on the axis of relative rotation of the parts 7 and 9, and also so that the eyepiece combination 2 can be adjusted to focus on the image formed by the object glass combination on its focal plane. The back sight wire 3 is adjusted so that it is always approximately in the focal plane of the object glass combination 1, by means of set screws 16, 17, which are arranged to move the whole galvanometer slightly in the necessary direction for this purpose.

The limits of movement of the back sight wire are marked by the points 11 and 12 on the plan view, and these limits can be fixed to any desired amount. By the above described arrangement the telescope can be turned about the axis of relative rotation of the parts 7 and 9, so that right up to the extreme limits of deflection of the back sight marked by the points 11 and 12, the back sight wire 3 may be viewed in the center of the field.

A casting 13 is attached rigidly to the box 7, a face 14 being formed on it to correspond with a fixed part of the gun cradle or carriage so that it can be connected thereto to form an additional support of the apparatus. This casting is formed with a segmental rim struck from a center on the axis of relative motion of the box 7 and its cover 9, so that it may act as a support for the eyepiece end of the telescope. The telescope may be pushed along this segmental arc when following the movement of the back sight in the field of view by hand or it may be actuated by gearing. The drawing shows it merely supported and held in position by a spring 50. This spring provides frictional resistance in addition to the frictional resistance of the ring joint 10. When the telescope is moved by steps notches are cut in this segment at the correct angular distances apart to correspond with the assigned steps through which the telescope is to be moved, a detent on the telescope engaging with these notches and acting to hold the telescope in the position defined by a notch.

A forehead rest may be arranged to release the telescope from the segment and so allow it to be pushed rapidly into a new position. These arrangements are matters of detail and can be adapted to suit the circumstances of the case.

It will be readily seen that the same electric current may be caused to actuate a number of gun sights of the type above described.

It will be seen that in the telescopes above described the object glass and eyepiece have separate focal planes. In the case of a simple telescope however only one principal focal plane exists, and is situated at the eyepiece end, and in the case of such a telescope the moving wire would be placed in this position.

Having now described our invention, what we claim as new and desire to secure by Letters Patent, is:—

1. Sighting apparatus for guns comprising a telescope including an object glass and eye-piece, a pivotal support for said telescope, said telescope turning about said support on an axis passing through the optical center of said object glass, and a sighting device independent of the pivotal movement of said telescope and situated in the focal plane of the object glass of said telescope, as and for the purpose described.

2. Sighting apparatus for guns comprising a telescope including an object glass and eye-piece, a pivotal support for said telescope, said telescope turning about said support on an axis passing through the optical center of said object glass, and a sighting device independent of the pivotal movement of said telescope and situated in the focal plane of the object glass of said telescope, said sighting device being in the form of a movable wire, as and for the purpose described.

3. Sighting apparatus for guns comprising a telescope including an object glass and eye-piece, a pivotal support for said telescope, said telescope turning about said support on an axis passing through the optical center of said object glass, and a sighting device independent of the pivotal movement of said telescope and situated in the focal plane of the object glass of said telescope, said sighting device being in the form of a moving wire, and means for controlling the movements of said wire by an electric current from a distance, as and for the purpose described.

In testimony whereof, we have affixed our signatures.

JOHN SIGISMUND WILSON.
WILLIAM ERNEST DALBY.